United States Patent
Chen

(10) Patent No.: US 8,218,230 B2
(45) Date of Patent: Jul. 10, 2012

(54) FLEXIBLE FLAT PANEL DISPLAY

(75) Inventor: Chih-Yen Chen, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 175 days.

(21) Appl. No.: 12/571,593

(22) Filed: Oct. 1, 2009

(65) Prior Publication Data

US 2011/0007380 A1    Jan. 13, 2011

(30) Foreign Application Priority Data

Jul. 7, 2009   (TW) ............................... 98122878 A

(51) Int. Cl.
*G02B 26/00* (2006.01)
*G02B 27/10* (2006.01)

(52) U.S. Cl. ........ 359/296; 359/290; 359/291; 359/625; 359/628

(58) Field of Classification Search .................. 359/290, 359/291, 296, 619, 620, 625, 628
See application file for complete search history.

(56) References Cited

U.S. PATENT DOCUMENTS

| | | | |
|---|---|---|---|
| 7,172,304 B2 | 2/2007 | Rodriguez et al. | |
| 7,206,040 B2 | 4/2007 | Kano | |
| 2002/0180910 A1* | 12/2002 | Umemoto et al. | 349/113 |
| 2003/0002162 A1* | 1/2003 | Hira | 359/619 |
| 2009/0284683 A1* | 11/2009 | Usukura et al. | 349/62 |
| 2010/0103529 A1* | 4/2010 | Nakamura et al. | 359/620 |
| 2010/0265566 A1* | 10/2010 | Han et al. | 359/296 |

FOREIGN PATENT DOCUMENTS

| | | |
|---|---|---|
| JP | 5053109 A | 3/1993 |
| TW | I284224 | 9/2002 |
| TW | I298399 | 10/2002 |
| WO | WO 2008032490 A1 * | 3/2008 |
| WO | WO 2008117854 A1 * | 10/2008 |
| WO | 2009017263 A1 | 2/2009 |

OTHER PUBLICATIONS

Chinese language office action dated Mar. 12, 2010. English language translation of abstract and pertinent parts of JP 5-53109A (published Mar. 5, 1993).
English language translation of abstract of TW I298399 (published Oct. 24, 2002).
English language translation of abstract of TW I284224 (published Sep. 9, 2009).

* cited by examiner

*Primary Examiner* — Ricky Mack
*Assistant Examiner* — Mahidere Sahle
(74) *Attorney, Agent, or Firm* — Thomas, Kayden, Horstemeyer & Risley, LLP

(57) ABSTRACT

A flat panel display is provided. The flat panel display includes a display panel, a light source module and an optical film. The display panel has a light incident surface. The light source module including a light guide plate which has a light emergent surface is disposed parallel to the display panel. The light emergent surface is opposite to the light incident surface. A light emitted from the light source module is transmitted from the light emergent surface to the light incident surface. The optical film is disposed between the display panel and the light source module. The optical film has a first surface and a second surface which are opposite to each other. A plurality of platform-shaped optical structures are formed on the first surface while each of them has a flat top surface. A first transparent glue layer and a second transparent glue layer are respectively formed on the light incident surface and the light emergent surface. The flat top surfaces are glued to one of the first transparent glue layer and the second transparent glue layer while the second surfaces are glued to the other.

22 Claims, 8 Drawing Sheets

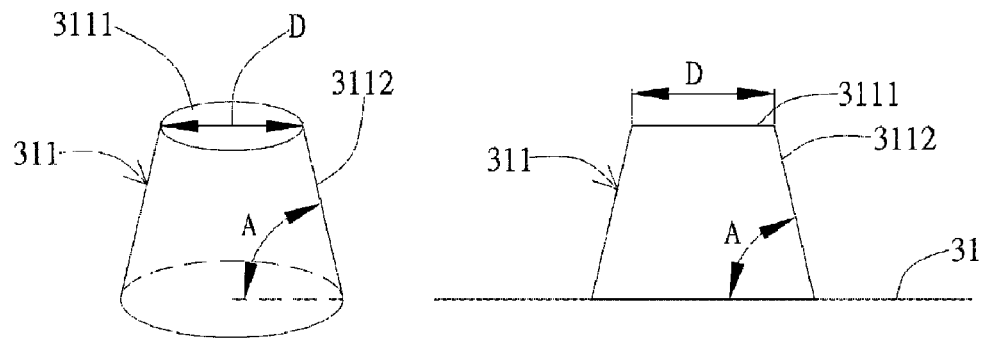
FIG.8A
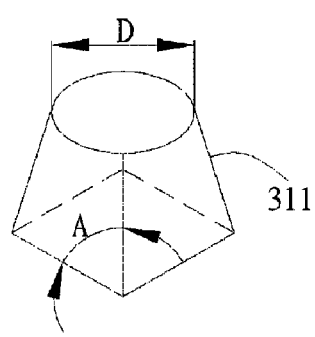 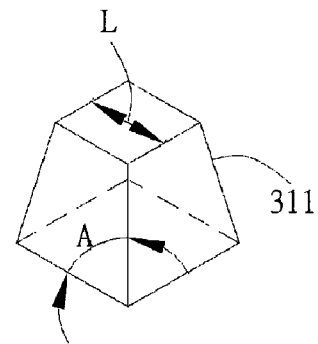
FIG.8B  FIG.8C
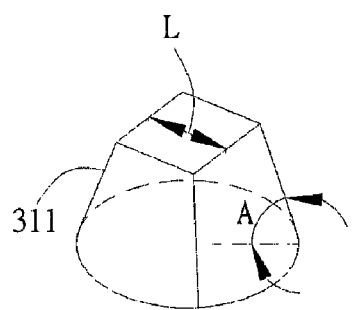
FIG.8D

FLEXIBLE FLAT PANEL DISPLAY

This application claims priority based on a Taiwanese Patent Application No. 098122878, filed on Jul. 7, 2009, the disclosure of which is incorporated herein by reference in its entirety.

BACKGROUND OF THE INVENTION

1. Field of the Invention

The present invention relates to a flat panel display (FPD); particularly, the present invention relates to a flat panel display having improved flexibility.

2. Description of the Related Art

To compare with conventional CRT (cathode ray tube) displays, flat panel displays have the advantages of small volume and low power consumption. Hence, as the development tendency of nowadays electronic products focuses on the features of lighter weight, thinner thickness, shorter length and smaller volume, flat panel displays have gradually replaced conventional CRT displays and become the mainstream monitor product of the 21st century.

There are various types of flat panel displays, wherein the LCD (liquid crystal display) which employs liquid crystals is one of the current dominant products. There are many LCD related products in market. Besides LCD monitors, LCD televisions are getting popular as well. Furthermore, other flat panel display products such as ePapers (electronic papers) which adopt the electrophoretic display technology are also getting commercialized.

Besides the advantages of high display resolution, high color contrast, low power consumption, and low cost, the most significant characteristic of ePapers is that ePaper can be bent as easy as paper. Different from other flat panel displays, but like papers, ePapers can display images by reflecting ambient lights without the help of additional light sources. Most of all, the ePaper can retain the displayed images even after the power supply is cut off, hence the effect of ink on paper can be highly simulated.

Either LCDs or ePapers must meet a certain flexibility requirement. In order to maintain the relative location of elements of a display device to prevent displacement and deformation in case of bending the display device, the connections between the elements must be firm enough.

However, one disadvantage of the existing design is that the connection between the display panel and the light source module is not firm enough. FIG. 1 is a cross-sectional view of a conventional flat panel display. As shown in FIG. 1, after being emitted from the light source 1, a ray 2 gets through the light guide plate 3 and a micro structure 4 thereon. Due to refraction and reflection at interfaces, the ray 2 is separated into a ray 2A and a ray 2B. The ray 2A serves as the light source of the display panel 5, while the ray 2B just exits the display module directly and therefore causes the waste of light energy. Consequently, the light energy provided by the light source 1 cannot be effectively transformed into a display light 2C resulting in degraded contrast and sharpness of the display module.

SUMMARY OF THE INVENTION

It is an objective of the present invention to provide a flat panel display to overcome the above problems, so that the connection between the display panel and the light source module can be enhanced.

It is another objective of the present invention to provide a flat panel display to enhance the light energy utilization.

The flat panel display of the present invention includes a display panel, a light source module, and an optical film. The display panel has a light incident surface. The light source module including a light guide plate is disposed parallel to the display panel. The light guide plate has a light emergent surface facing the light incident surface of the display panel. A light emitted from the light source module is transmitted from the light emergent surface to the light incident surface.

The optical film is disposed between the display panel and the light source module. The optical film has a first surface and a second surface which are opposite to each other. A plurality of platform-shaped optical structures are formed on the first surface, and each platform-shaped optical structure has a flat top surface. A first transparent glue layer and a second transparent glue layer are respectively formed on the light incident surface and the light emergent surface. The flat top surfaces of the platform-shaped optical structures are glued to one of the first transparent glue layer and the second transparent glue layer while the second surface of the optical film is glued to the other of the transparent glue layers. Such a structure enhances the connection between the display panel and the light source module, so that the flexibility of the display device is improved. Furthermore, the air gap between the display panel and the light source module is also eliminated to improve the light usability.

BRIEF DESCRIPTION OF THE DRAWINGS

FIG. 8A is a schematic view of the platform-shaped optical structure of the flexible flat panel display shown in FIG. 2;

FIG. 8B is a schematic view of a second embodiment of a platform-shaped optical structure;

FIG. 8C is a schematic view of a third embodiment of a platform-shaped optical structure;

FIG. 8D is a schematic view of a fourth embodiment of a platform-shaped optical structure;

DETAILED DESCRIPTION OF THE PREFERRED EMBODIMENT

The present invention provides a flexible flat panel display. In a preferred embodiment, the flexible flat panel display of the present invention can be applied to various flat panel displays such as LCD, ePaper, etc.

Figure 1:
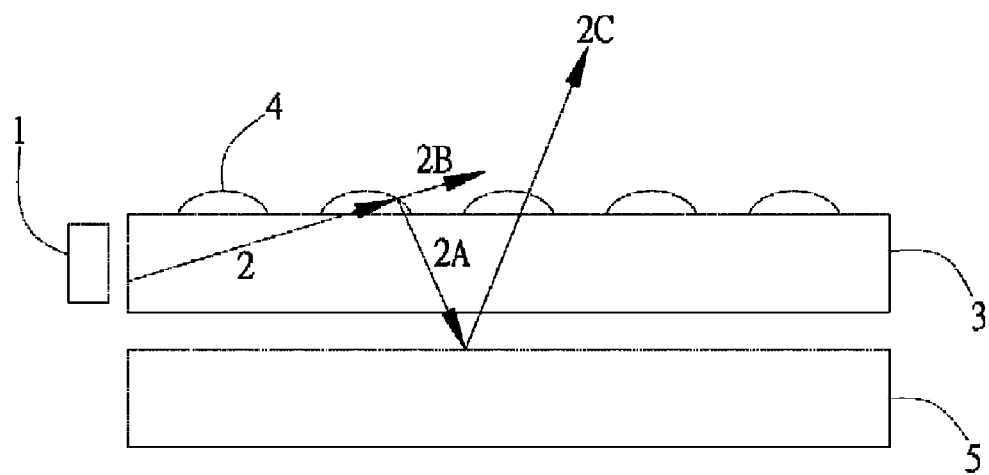
FIG. 1 is a cross-sectional view of a conventional flat panel display.
Figure 2:
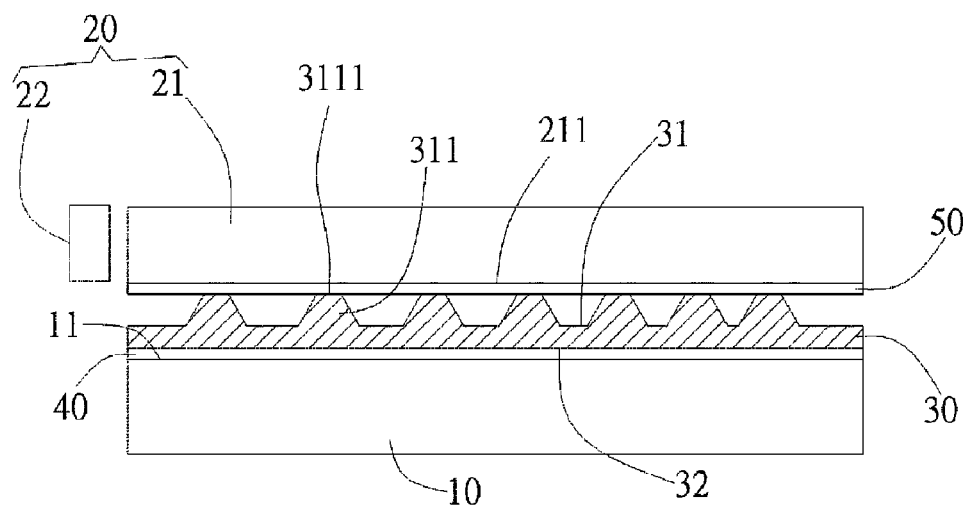
FIG. 2 is a cross-sectional view of an embodiment of a flexible flat panel display of the present invention.

FIG. 2 is a cross-sectional view of an embodiment of a flexible flat panel display of the present invention. As shown in FIG. 2, the flat panel display includes a display panel 10, a light source module 20, and an optical film 30. In a preferred embodiment, the display panel 10 is an electrophoretic display panel. The common electrophoretic display panel employs numerous micro capsules in transparent liquid media to display images in black and white. Each micro capsule is composed of two hemispheres which are black and white respectively. The rotation of micro capsules are controlled by changing the electric field, so that texts or images can be shown in black and white on the display surface of the electrophoretic display panel under illumination of external light. However, in other embodiments, the display panel 10 can be a reflective LCD panel or a flat panel display of other type. The display panel 10 has a light incident surface 11. The light incident surface 11 faces upwardly toward the light source module 20 to receive light from the light source module 20 and reflect the light to form a display light which exits the light incident surface 11 upwardly. In this circumstance, the light incident surface 11 is employed as the display surface. A first transparent glue layer 40 is formed on the light incident surface 11 and serves to bond the optical film 30 to the display panel 10.

As shown in FIG. 2, the light source module 20 including a light guide plate 21 and a light source 22 is disposed parallel to and over the display panel 10 with the optical film 30 therebetween. The light guide plate 21 includes a light emergent surface 211 which faces downwardly toward the display panel 10 and corresponds to the light incident surface 11. A second transparent glue layer 50 is formed on the light emergent surface 211 and serves to bond the light guide plate 21 and the optical film 30 together.

Figure 3:
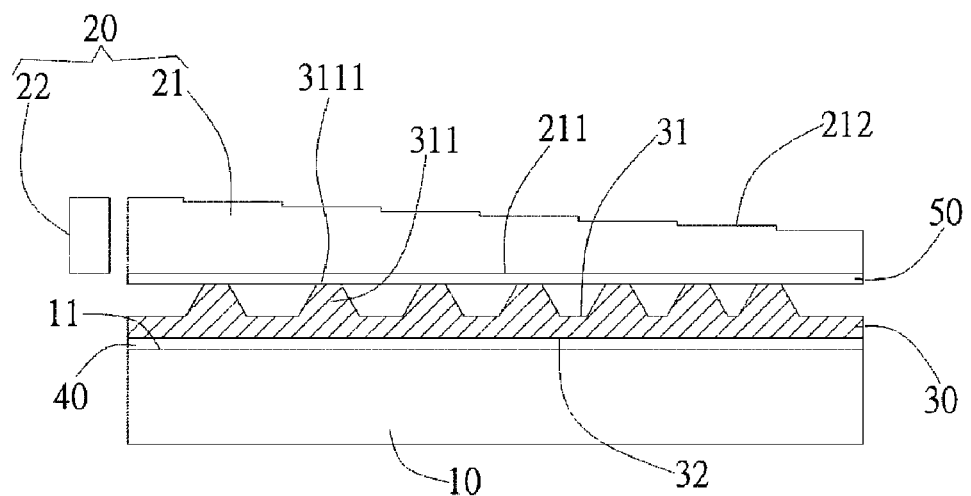
FIG. 3 is a schematic view of a flexible flat panel display with a wedge-shaped light guide plate of the present invention.

The light source 22 is disposed adjacent to the light guide plate 21 to provide light to the light guide plate 21. In a preferred embodiment, the light source 22 can be a light emitting diode (LED), a cold cathode fluorescence lamp (CCFL), or an electroluminescence (EL). In this embodiment, the light guide plate 21 is designed as a flat plate. However, in other embodiments, as shown in FIG. 3, the light guide plate 21 can be designed as a wedge-shaped light guide plate, so that a back surface 212 opposite to the light emergent surface 211 is formed with a step structure. The light source 22 is disposed adjacent to the thicker end of the light guide plate 21.

The optical film 30 disposed between the display panel 10 and the light source module 20 has a first surface 31 and a second surface 32 which are opposite to each other. A plurality of platform-shaped optical structures 311 are formed on the first surface 31. Each of the platform-shaped optical structures 311 is formed as a tapered structure such as a cone structure or a structure with a narrower top and a wider bottom. The upper end of each platform-shaped optical structure 311 has a flat top surface 3111. Each of the platform-shaped optical structures 311 preferably has a same height, so that the flat top surfaces 3111 are substantially coplanar. In a preferred embodiment, the disposing density of the platform-shaped optical structures 311 can be varied across the first surface 31 of the optical film 30. For example, in order to obtain a uniform light distribution, the platform-shaped optical structures 311 can be disposed sparser near the light source and much dense at the positions away from the light source. However, in other embodiments, the platform-shaped optical structures 311 can be disposed with a consistent distance therebetween. In this embodiment, the flat top surface 3111 of the platform-shaped optical structure 311 is preferably glued to the second transparent glue layer 50, while the second surface 32 of the optical film 30 is preferably glued to the first transparent glue layer 40.

Figure 4A:
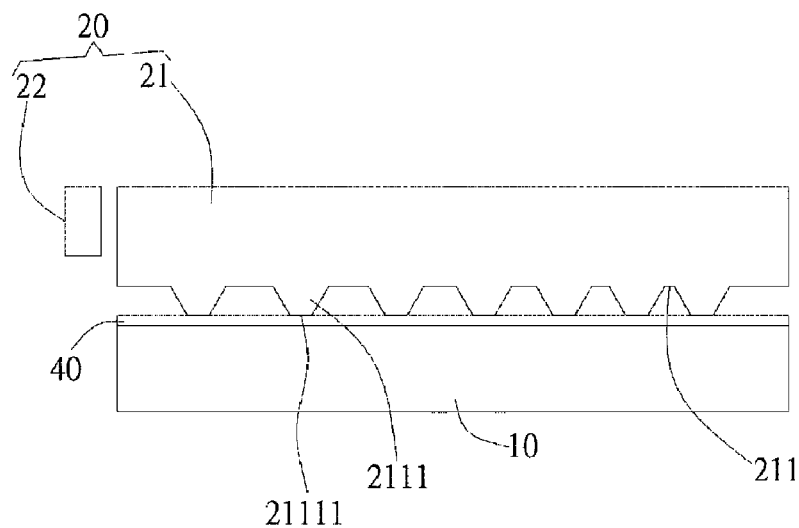
FIG. 4A is a schematic view of another embodiment of the disposition of the optical film of the flexible flat panel display shown in FIG. 2.

Because the tapered configuration of the platform-shaped optical structure 311 which has a narrower top and a wider bottom can direct the lights incident onto the display panel 10 to a positive direction, the tapered configuration can be applied to the electrophoretic display or reflective LCD panel of FIG. 2 which employs the front light as the light source. However, in other embodiments, as shown in FIG. 4A, the optical film can be formed directly on the light emergent surface 211. That is, the optical film and the light guide plate 21 are integrally formed. In such a case, the flat top surface 21111 of the platform-shaped optical structure 2111 can be glued to the display panel 10 through the first transparent glue layer 40. Since the platform-shaped optical structures 2111 has a reversed tapered configuration which has a wider top and a narrow bottom, it will cause the light incident onto the display panel 10 to be spread out. Therefore, this configuration can only be applied to the electrophoretic display or reflective LCD panel which employs a front light module.

Figure 4B:
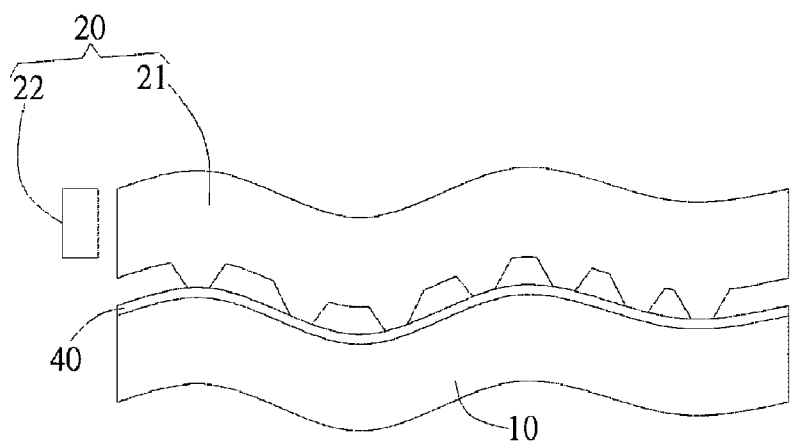
FIG. 4B is a schematic view of bending the flexible flat panel display shown in FIG. 4A.

FIG. 4B is a schematic view of bending the flexible flat panel display of FIG. 4A. As shown in FIG. 4B, when the flexible display panel 10 and the flexible light guide panel 21 are bent to deform, the flexible display panel 10 and the flexible light guide panel 21 can deflect simultaneously through the bonding of the first transparent glue layer 40. The first transparent glue layer 40 provides a firm connection between the display panel 10 and the light source module 20, so that the entire display device has an improved flexibility without causing elements to be displaced or deformed significantly.

Figure 5:
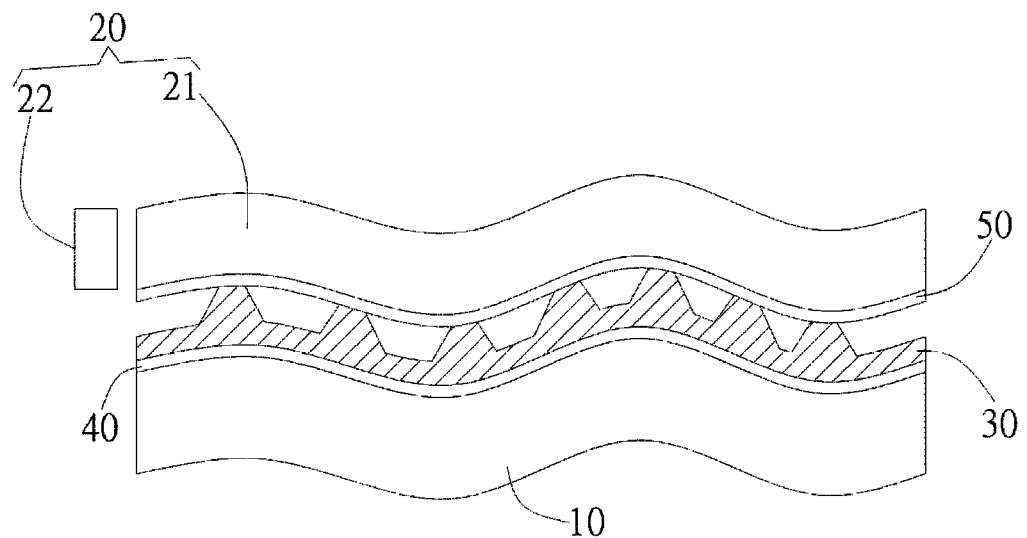
FIG. 5 is a schematic view of bending of the flexible flat panel display shown in FIG. 2.

FIG. 5 is a schematic view of bending the flexible flat panel display shown in FIG. 2. As shown in FIG. 5, when the display panel 10, the light guide plate 21, and the optical film 30 are bent to deform, the display panel 10, the light guide plate 21, and the optical film 30 can deflect simultaneously through the bonding of the first transparent glue layer 40 and the second transparent glue layer 50. The first transparent glue layer 40 and the second transparent glue layer 50 provide firm connections among the display panel 10, the light source module 20, and the optical film 30, so that the display device has an improved flexibility without causing displacement and deformation of elements significantly.

Figure 6A:
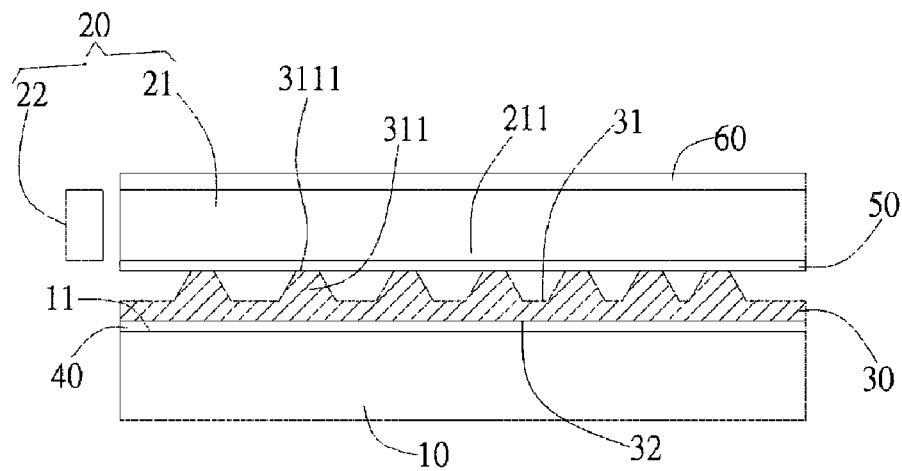
FIG. 6A is a cross-sectional view of another embodiment of a flexible flat panel display of the present invention.
Figure 6B:
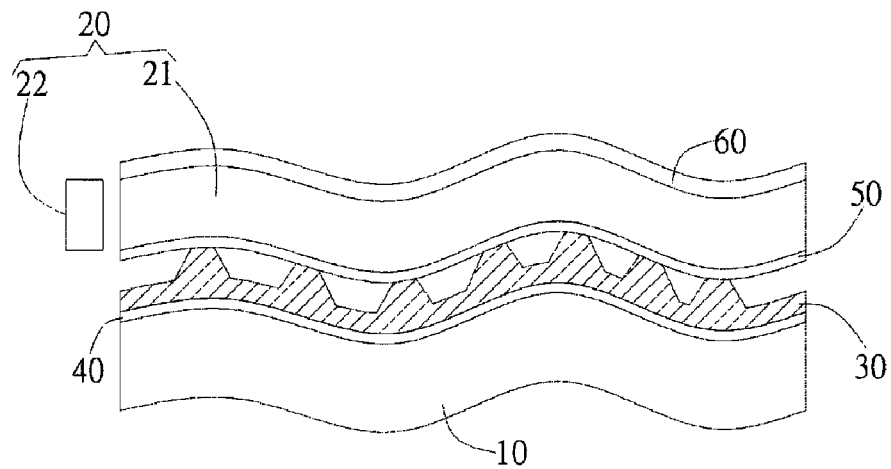
FIG. 6B is a schematic view of bending the flexible flat panel display shown in FIG. 6A.

Moreover, in other embodiments, a touch panel can be further disposed on the light guide plate so as to provide the touch screen function. As shown in FIG. 6A, the touch panel 60 is disposed on the light guide plate 21, so that one side of the touch panel 60 faces outwardly while the other side of the touch panel 60 is overlapped and bonded to the light guide plate 21. FIG. 6B is a schematic view of bending the flexible flat panel display shown in FIG. 6A.

Figure 7:
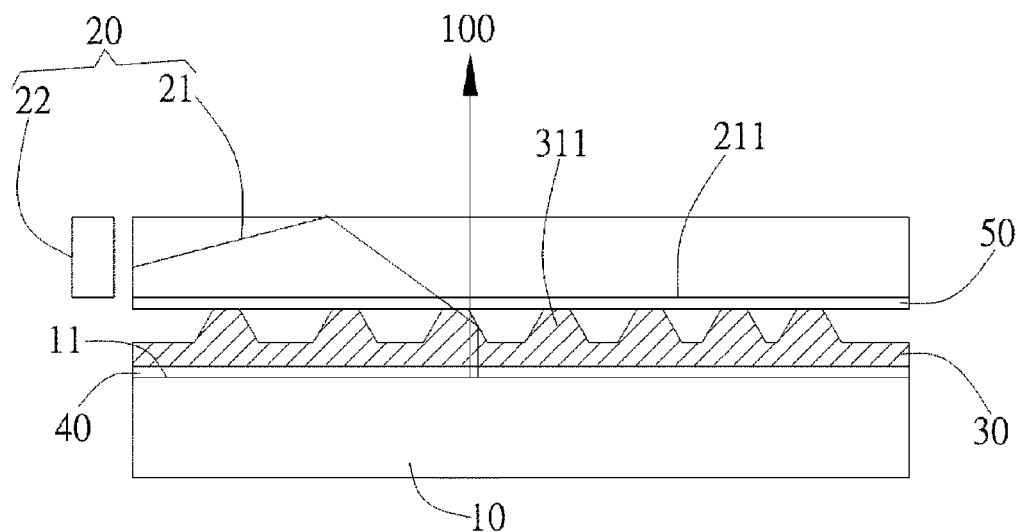
FIG. 7 is a schematic view of a light path in the flexible flat panel display shown in FIG. 2.

FIG. 7 is a schematic view of a light path in the flexible flat panel display of FIG. 2. As shown in FIG. 7, after the light emitted by the light source 22 passes through the light guide plate 21, the light exits the light emergent surface 211 and passes through the second transparent glue layer 50, the optical structure 30, and the first transparent glue layer 40, and then enters into the electrophoretic display panel 10 through the light incident surface 11. The electrophoretic display panel 10 transforms the incident light into the display light 100 which is then emitted from the light incident surface 11. The optical film 30 can enable the light passing therethrough to be distributed much uniformly on the display panel 10 to achieve a uniform light distribution.

In a preferred embodiment, the optical film 30 can be made of polymethyl methacrylate (PMMA), polycarbonate (PC), polyethylene terephthalate (PET), or other transparent flexible materials. The first transparent glue layer 40 and the second transparent glue layer 50 can be made of a material having a refractivity equal to or approximate to that of the optical film 30, so as to reduce the influence on optical properties caused by the difference in refractivity. Furthermore, the air gap between the display panel 10 and the optical film 30 can be eliminated through the first transparent glue layer 40 and the second transparent glue layer 50, so as to reduce the opportunity of transmitting the light among media of different refractivity and to obtain better optical properties. Besides, in a preferred embodiment, UV glue (e.g. ultraviolet curable resin) can be employed as the material of the first transparent glue layer 40 and the second transparent glue layer 50. However, in other embodiments, other types of glue can be employed.

FIG. 8A is a schematic view of the platform-shaped optical structure of the flexible flat panel display shown in FIG. 2. As shown in FIG. 8A, the platform-shaped optical structure 311 includes a tapered structure such as a conical structure with a flat top surface 3111 and a sidewall 3112. The sidewall 3112 extends outwardly from the edge of the round flat top surface 3111 toward the first surface 31 of the optical film 30. The platform-shaped optical structure 311 can have a cross-section in round shape or polygonal shape. For example, in the embodiment of FIG. 8A, the platform-shaped optical structure 311 can have a cross-section in round shape with two round flat surfaces on the top and the bottom. The shape of the platform-shaped optical structure 311 can be changed according to the design requirement. As shown in FIG. 8B, the platform-shaped optical structure 311 may have a polygonal cross-section with a round flat top surface and a polygonal bottom surface. As shown in FIG. 8C, the platform-shaped optical structure 311 may have a polygonal cross-section with two polygonal flat surfaces on the top and the bottom. As shown in FIG. 8D, the platform-shaped optical structures 311 may have a round cross-section with a polygonal flat top surface and a round bottom surface. Moreover, the platform-shaped optical structures 311 can be designed to have other shapes according to the design requirement. In a preferred embodiment, an angle A between the sidewall 3112 and the first surface 31 of the optical film 30 is between 30° and 90°. When the flat top surface 3111 is round, the diameter D thereof is preferably between 1 μm and 60 μm. When the flat top surface 3111 is polygonal, the longest distance L between two sides is preferably between 1 μm and 60 μm.

Figure 9A:
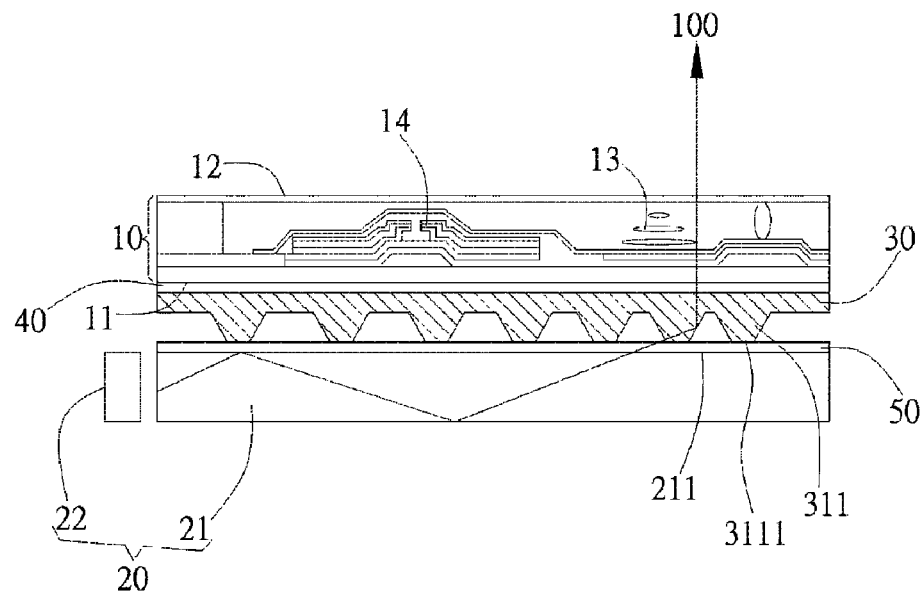
FIG. 9A is a cross-sectional view of a further embodiment of a flexible flat panel display of the present invention.
Figure 9B:
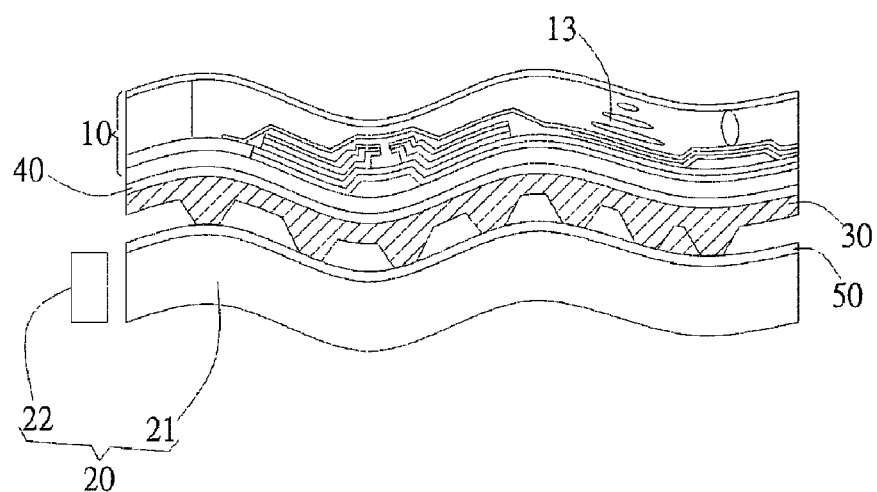
FIG. 9B is a schematic view of bending the flexible flat panel display shown in FIG. 9A.

FIG. 9A is a cross-sectional view of a further embodiment of a flexible flat panel display of the present invention. In this embodiment, the display panel 10 can be a transmissive LCD panel or a transflective LCD panel. As shown in FIG. 9A, the display device includes a display panel 10, a light source module 20, and an optical film 30. The display panel 10 has a light incident surface 11 and a display surface 12 which are opposite to each other, and includes a liquid crystal layer 13 and a thin-film transistor (TFT) device 14. After the light emitted by the light source 22 passes through the light guide plate 21, the light exits the light emergent surface 211 and passes through the second transparent glue layer 50, the optical film 30, and the first transparent glue layer 40, and then enters into the liquid crystal display panel 10 through the light incident surface 11. The liquid crystal display panel 10 transforms the light into a display light 100, which then exits the liquid crystal display panel 10 from the display surface 12. FIG. 9B is a schematic view of bending the flexible flat panel display shown in FIG. 9A. As shown in FIG. 9B, through the bonding of the first transparent glue layer 40 and the second transparent glue layer 50, the display panel 10, the light guide plate 21, and the optical structure 30 can deflect simultaneously.

Although the present invention has been described through the above-mentioned related embodiments, the above-mentioned embodiments are merely the examples for practicing the present invention. What need to be indicated is that the disclosed embodiments are not intended to limit the scope of the present invention. On the contrary, the modifications within the essence and the scope of the claims and their equivalent dispositions are all contained in the scope of the present invention.

What is claimed is:

1. A flat panel display, comprising:
a display panel having a light incident surface, wherein a first transparent glue layer is formed on the light incident surface;
a light source module disposed parallel to the display panel, wherein the light source module includes a light guide plate having a light emergent surface facing the light incident surface of the display panel, a second transparent glue layer is formed on the light emergent surface, a light emitted from the light source module is transmitted from the light emergent surface to the light incident surface; and
an optical film disposed between the display panel and the light source module, the optical film having a first surface and a second surface opposite to the first surface, a plurality of platform-shaped optical structures being formed on the first surface to form a flat exposed surface, each of the platform-shaped optical structures having a flat top surface;
wherein the flat top surfaces of the plurality of platform-shaped optical structures are selectively glued to one of the first transparent glue layer and the second transparent glue layer while the second surface of the optical film is glued to the other of the first transparent glue layer and the second transparent glue layer, and wherein the flat exposed surface does not contact any one of the first transparent glue layer and the second transparent glue layer.

2. The flat panel display of claim 1, wherein the display panel, the light guide plate, and the optical film are flexible and bonded by the first transparent glue layer and the second transparent glue layer, so that the display panel, the light guide plate, and the optical film deflect simultaneously.

3. The flat panel display of claim 1, wherein each of the platform-shaped optical structures has a tapered structure with a sidewall extending outwardly from the flat top surface toward the first surface of the optical film, an angle between the sidewall and the first surface is between 30° and 90°.

4. The flat panel display of claim 3, wherein the tapered structure has a cross-section selected from one of a round shape and a polygonal shape.

5. The flat panel display of claim 1, wherein the flat top surface has a shape selected from one of a polygonal shape and a round shape.

6. The flat panel display of claim 1, wherein the flat top surface has a diameter between 1 μm and 60 μm.

7. The flat panel display of claim 1, wherein a refractivity of the first transparent glue layer approximates to that of the optical film.

8. The flat panel display of claim 1, wherein a refractivity of the second transparent glue layer approximates to that of the optical film.

9. The flat panel display of claim 1, wherein the display panel is substantially an electrophoretic display, a light emitted by the light source module enters into the electrophoretic display via the light incident surface of the electrophoretic display after passing through the optical film, and exits the light incident surface after the light is transformed into a display light by the electrophoretic display.

10. The flat panel display of claim 1, wherein the light guide plate has a back surface opposite to the light emergent surface, a step structure is formed on the back surface.

11. The flat panel display of claim 1, wherein the display panel is substantially a liquid crystal display panel, the second surface of the optical film is glued to the first transparent glue layer while the flat top surfaces of the platform-shaped optical structures are glued to the second transparent glue layer, the liquid crystal display panel has a display surface opposite to the light incident surface, the light emitted by the light source module enters into the liquid crystal display panel via the light incident surface of the liquid crystal display after passing through the optical film, and then exits from the display surface after the light is transformed into a display light by the liquid crystal display panel.

12. The flat panel display of claim 1, wherein the optical film is formed directly on the light emergent surface.

13. An electrophoretic display, comprising:
an electrophoretic display panel having a light incident surface, wherein a first transparent glue layer is formed on the light incident surface;
a light source module disposed parallel to the electrophoretic display panel, wherein the light source module includes a light guide plate, having a light emergent surface facing the light incident surface of the electrophoretic display panel, a second transparent glue layer is formed on the light emergent surface, a light emitted from the light source module is transmitted from the light emergent surface to the light incident surface; and
an optical film disposed between the electrophoretic display panel and the light source module, the optical film having a first surface and a second surface opposite to the first surface, a plurality of platform-shaped optical structures being formed on the first surface to form a flat exposed surface, each of the platform-shaped optical structures having a flat top surface;
wherein the flat top surfaces of the plurality of platform-shaped optical structures are selectively glued to one of the first transparent glue layer and the second transparent glue layer while the second surface of the optical film is glued to the other of the first transparent glue layer and the second transparent glue layer, and wherein the flat exposed surface does not contact any one of the first transparent glue layer and the second transparent glue layer.

14. The electrophoretic display of claim 13, wherein the electrophoretic display panel, the light guide plate, and the optical film are flexible and bonded by the first transparent glue layer and the second transparent glue layer, so that the electrophoretic display panel, the light guide plate, and the optical film deflect simultaneously.

15. The electrophoretic display of claim 13, wherein each of the platform-shaped optical structures has a tapered structure with a sidewall extending outwardly from the flat top surface toward the first surface of the optical film, an angle between the sidewall and the first surface is between 30° and 90°.

16. The electrophoretic display of claim 15, wherein the tapered structure has a cross-section selected from one of a round shape and a polygonal shape.

17. The electrophoretic display of claim 13, wherein the flat top surface has a shape selected from one of a polygonal shape and a round shape.

18. The electrophoretic display of claim 13, wherein the flat top surface has a diameter between 1 µm and 60 µm.

19. The electrophoretic display of claim 13, wherein a refractivity of the first transparent glue layer approximates to that of the optical film.

20. The electrophoretic display of claim 13, wherein a refractivity of the second transparent glue layer approximates to that of the optical film.

21. The electrophoretic display of claim 13, wherein the light guide plate has a back surface opposite to the light emergent surface, a step structure is formed on the back surface.

22. The electrophoretic display of claim 13, wherein the optical film is formed directly on the light emergent surface.

* * * * *